United States Patent
Grani et al.

(10) Patent No.: US 10,477,338 B1
(45) Date of Patent: Nov. 12, 2019

(54) METHOD, APPARATUS AND COMPUTER PROGRAM PRODUCT FOR SPATIAL AUDITORY CUES

(71) Applicant: HERE Global B.V., Eindhoven (NL)

(72) Inventors: Francesco Grani, Berlin (DE); Stephan Scheunig, Wanditz (DE); Stefano Trento, Berlin (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/004,552

(22) Filed: Jun. 11, 2018

(51) Int. Cl.
*H04S 7/00* (2006.01)
*G08G 1/0968* (2006.01)

(52) U.S. Cl.
CPC ....... *H04S 7/303* (2013.01); *G08G 1/096872* (2013.01); *H04R 2499/13* (2013.01)

(58) Field of Classification Search
CPC .............. H04S 7/303; G08G 1/096872; H04R 2499/13; G10L 15/18
USPC ........ 381/300, 302, 17, 310, 61, 86; 700/94, 700/246; 704/9, E15.018, 257
See application file for complete search history.

(56) References Cited

U.S. PATENT DOCUMENTS

| | | | |
|---|---|---|---|
| 5,857,026 A * | 1/1999 | Scheiber | H04S 3/00 381/18 |
| 9,049,534 B2 | 6/2015 | Eichfeld et al. | |
| 9,464,912 B1 | 10/2016 | Smus et al. | |
| 9,638,530 B2 | 5/2017 | Nielsen | |
| 9,756,447 B2 * | 9/2017 | Enamito | H04S 1/002 |
| 2003/0007648 A1 * | 1/2003 | Currell | H04S 7/30 381/61 |
| 2004/0076301 A1 * | 4/2004 | Algazi | H04S 7/304 381/17 |
| 2008/0215239 A1 | 9/2008 | Lee | |
| 2009/0046864 A1 * | 2/2009 | Mahabub | H04S 7/30 381/17 |
| 2009/0122994 A1 * | 5/2009 | Ohta | H04S 1/002 381/17 |
| 2012/0070005 A1 | 3/2012 | Inou et al. | |
| 2013/0158856 A1 | 6/2013 | Xiang | |
| 2014/0058662 A1 | 2/2014 | Tachibana et al. | |
| 2014/0219485 A1 | 8/2014 | Jensen et al. | |

(Continued)

FOREIGN PATENT DOCUMENTS

WO    WO 2017/125821    7/2017

*Primary Examiner* — Vivian C Chin
*Assistant Examiner* — Con P Tran
(74) *Attorney, Agent, or Firm* — Alston & Bird LLP

(57) ABSTRACT

A method, apparatus, and computer program product are therefore provided for providing a navigation user interface. The apparatus may be caused to: receive an indication of location based information for a user; provide for generation of a first auditory cue, where generation of the first auditory cue may include generating an audio cue having a virtual source location using three-dimensional audio effects. Providing for generation of the first auditory cue may include causing the apparatus to: provide for generation of a beginning of the first auditory cue at a first virtual source location; and provide for generation of a transition phase of the first auditory cue moving the virtual source location from the first virtual source location along a trajectory and ending at a second virtual source location, where the second virtual source location is a location positioned between the user and a location identified in the location based information.

20 Claims, 7 Drawing Sheets

(56) References Cited

U.S. PATENT DOCUMENTS

2015/0030159 A1    1/2015   Ozcan
2016/0059775 A1    3/2016   Gorse et al.

\* cited by examiner

METHOD, APPARATUS AND COMPUTER PROGRAM PRODUCT FOR SPATIAL AUDITORY CUES

TECHNOLOGICAL FIELD

An example embodiment of the present invention relates generally to navigation assistance, at least semi-autonomous vehicle control, and user interface techniques, and more particularly, to a method, apparatus and computer program product for providing spatial auditory cues to facilitate user interaction with navigational assistance or at least semi-autonomous vehicle control.

BACKGROUND

Maps have been used for centuries for providing route geometry and geographical information, while routes have conventionally been planned by hand along paths defined by the maps. Conventional paper maps including static images of roadways and geographic features from a snapshot in history have given way to digital maps presented on computers and mobile devices, and navigation has been enhanced through the use of graphical user interfaces.

Digital maps and navigation can provide dynamic route guidance to users as they travel along a route. Further, dynamic map attributes such as route traffic, route conditions, and other dynamic map-related information may be provided to enhance the digital maps and facilitate navigation. Different map service providers along with different user interfaces (e.g., different mobile devices or different vehicle navigation systems) may result in non-uniform map and route guidance interfaces, which may not be intuitive or easily understood by a user, particularly one that is accustomed to a different type of map and navigation interface. Further, visual displays of route guidance instructions may not always be convenient or safe for a user to reference. As such, route guidance is often coupled with audible commands regarding maneuvers such as turns. However, these audible commands may be confusing or difficult to understand when provided in a complex intersection or when faced with multiple similar maneuver options.

BRIEF SUMMARY

A method, apparatus, and computer program product are therefore provided for providing a user interface for navigation. Embodiments may provide an apparatus including at least one processor and at least one non-transitory memory including computer program code instructions. The computer program code instructions may be configured to, when executed, cause the apparatus to at least: receive an indication of location based information for a user; provide for generation of a first auditory cue in response to receiving the indication of location based information, where the first auditory cue includes a sound configured to alert the user of the availability of the location based information; provide for generation of a second auditory cue, where generation of the second auditory cue include generating an auditory cue having a virtual source location using three-dimensional spatial audio cues. The apparatus may provide for generation of a beginning of the second audio cue at a first virtual source location, and provide for generation of a transition phase of the second audio cue moving the virtual source location from the first virtual source location along a trajectory and ending at a second virtual source location, where the second virtual source location is a location positioned between the user and a location identified in the location based information.

According to some embodiments, the apparatus may be caused to provide a third auditory cue in response to the second auditory cue ending, where the third auditory cue includes a sound generated with a virtual source location at the second virtual source location. The first auditory cue may include an omnidirectional sound lacking a perceptible virtual source location from which the sound emanates. The second auditory cue may include a natural language sentence conveying the location based information to the user. The first auditory cue and the second auditory cue may be generated by a plurality of audio speakers using at least one spatial audio method. The first virtual source location may be proximate the user's head, where the trajectory may be a curved trajectory from the first virtual source location to the second virtual source location. The curved trajectory may be in a horizontal plane.

Embodiments may provide a computer program product including at least one non-transitory computer-readable storage medium having computer executable program code instructions stored therein. The computer-executable program code instructions may include program code instructions to: receive an indication of location based navigation information for a user; provide for generation of an auditory cue, where generation of the auditory cue includes generating an auditory cue having a virtual source location using three-dimensional audio effects. The apparatus may be caused to: provide for generation of a beginning of the auditory cue at a first virtual source location; and provide for generation of a transition phase of the auditory cue moving the virtual source location from the first virtual source location along a trajectory and ending at a second virtual source location, where the second virtual source location is a location positioned between the user and a location identified in the location based navigation information, where the auditory cue includes natural language instructions regarding route guidance.

The auditory cue may be a first auditory cue, where the computer program product may optionally include program code instructions to: provide a second auditory cue in response to the first auditory cue ending, where the second auditory cue includes a sound generated with a virtual source location at the second virtual source location. The auditory cue may include an instruction regarding a maneuver to remain on a route of the route guidance, where the second virtual source location may be positioned between the user and a location associated with the maneuver. The auditory cue may be a first auditory cue, and the computer program product may include program code instructions to provide for generation of an initial auditory cue, where the initial auditory cue precedes the first auditory cue and includes an omnidirectional sound relative to the user. The initial auditory cue and the first auditory cue may be configured to be generated by a plurality of audio speakers using at least one spatial audio method. The first virtual source location may be proximate a user's head and the trajectory may be a curved trajectory from the first virtual source location to the second virtual source location. The curved trajectory may be in a horizontal plane.

Embodiments provided herein may include a method including: receiving an indication of location based information for a user; providing for generation of a first auditory cue, where generation of the first auditory cue may include generating an audio cue having a virtual source location using three-dimensional audio effects. Providing for generation of the first auditory cue may include: providing for generation of a beginning of the first auditory cue at a first virtual source location; providing for generation of a transition phase of the first auditory cue moving the virtual source location from the first virtual source location along a trajectory and ending at a second virtual source location, where the second virtual source location is a location positioned between the user and a location identified in the location based information. A second auditory cue may be provided in response to the first auditory cue ending, where the second auditory cue includes a sound generated with a virtual source location at the second virtual source location.

Methods may include providing an initial auditory cue before the first auditory cue, where the initial auditory cue includes an omnidirectional sound relative to the user. The initial auditory cue may include an omnidirectional sound lacking a perceptible virtual source location from which the sound emanates. The first auditory cue may include a natural language sentence conveying the location based information to the user. The first auditory cue and the second auditory cue may be configured to be generated by a plurality of audio speakers using at least one spatial audio method. The first virtual source location may be proximate the user's head and the trajectory may be a curved trajectory from the first virtual source location to the second virtual source location.

Embodiments provided herein may include an apparatus including: means for receiving an indication of location based information for a user; means for providing for generation of a first auditory cue, where generation of the first auditory cue may include generating an audio cue having a virtual source location using three-dimensional audio effects. The means for providing for generation of the first auditory cue may include: means for providing for generation of a beginning of the first auditory cue at a first virtual source location; and means for providing for generation of a transition phase of the first auditory cue moving the virtual source location from the first virtual source location along a trajectory and ending at a second virtual source location, where the second virtual source location is a location positioned between the user and a location identified in the location based information. A second auditory cue may be provided in response to the first auditory cue ending, where the second auditory cue includes a sound generated with a virtual source location at the second virtual source location.

An example apparatus may include means for providing an initial auditory cue before the first auditory cue, where the initial auditory cue includes an omnidirectional sound relative to the user. The initial auditory cue may include an omnidirectional sound lacking a perceptible virtual source location from which the sound emanates. The first auditory cue may include a natural language sentence conveying the location based information to the user. The first auditory cue and the second auditory cue may be configured to be generated by a plurality of audio speakers using at least one spatial audio method. The first virtual source location may be proximate the user's head and the trajectory may be a curved trajectory from the first virtual source location to the second virtual source location.

BRIEF DESCRIPTION OF THE DRAWINGS

Figure 1:
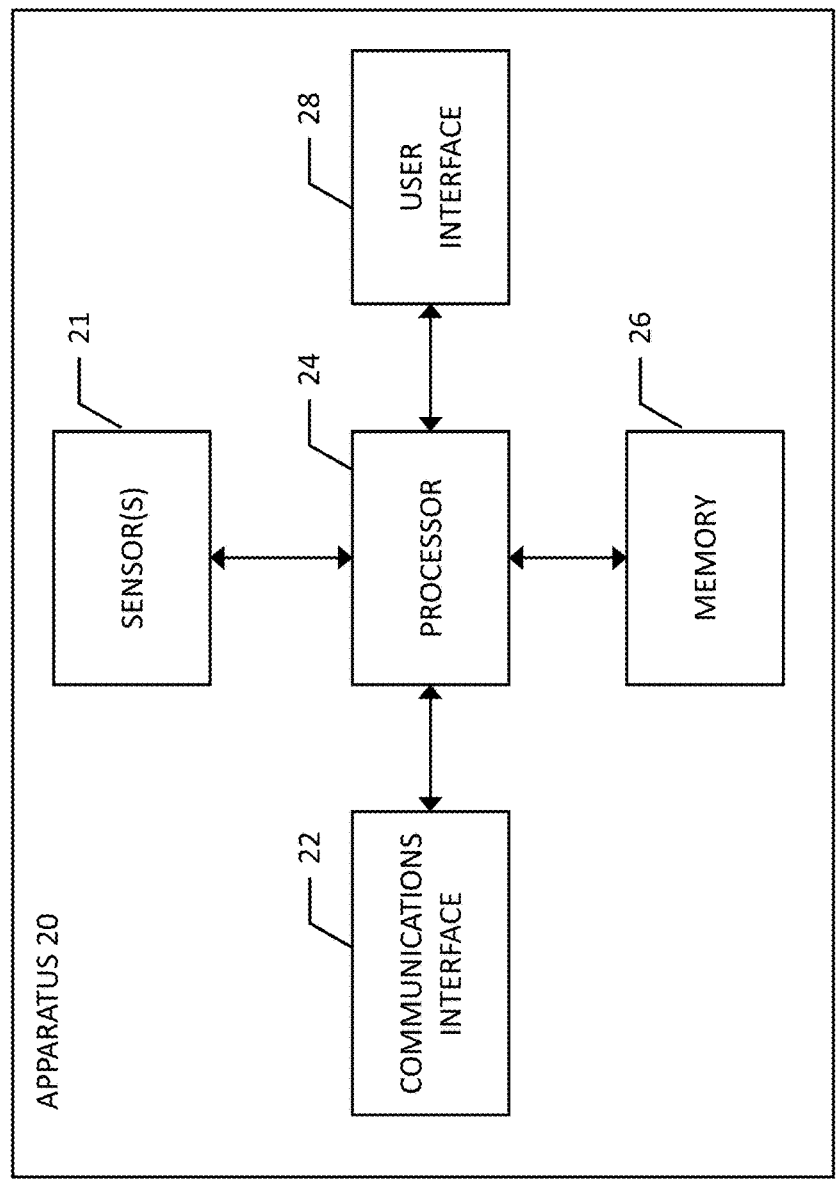
Figure 2:
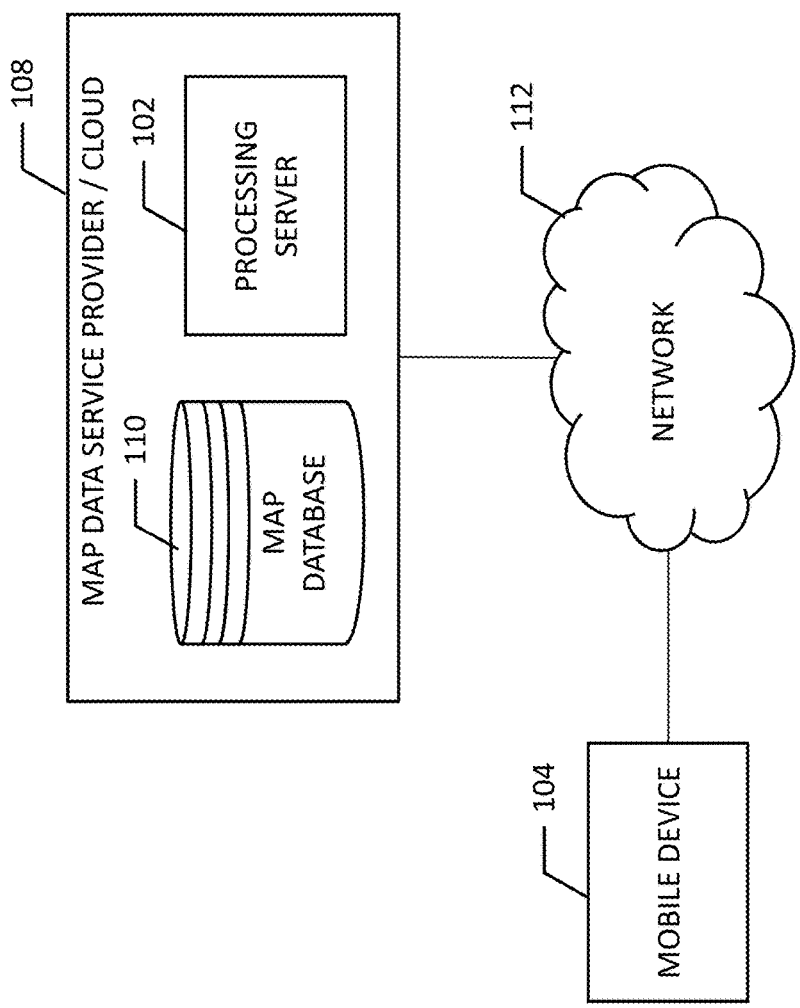
Figure 3:
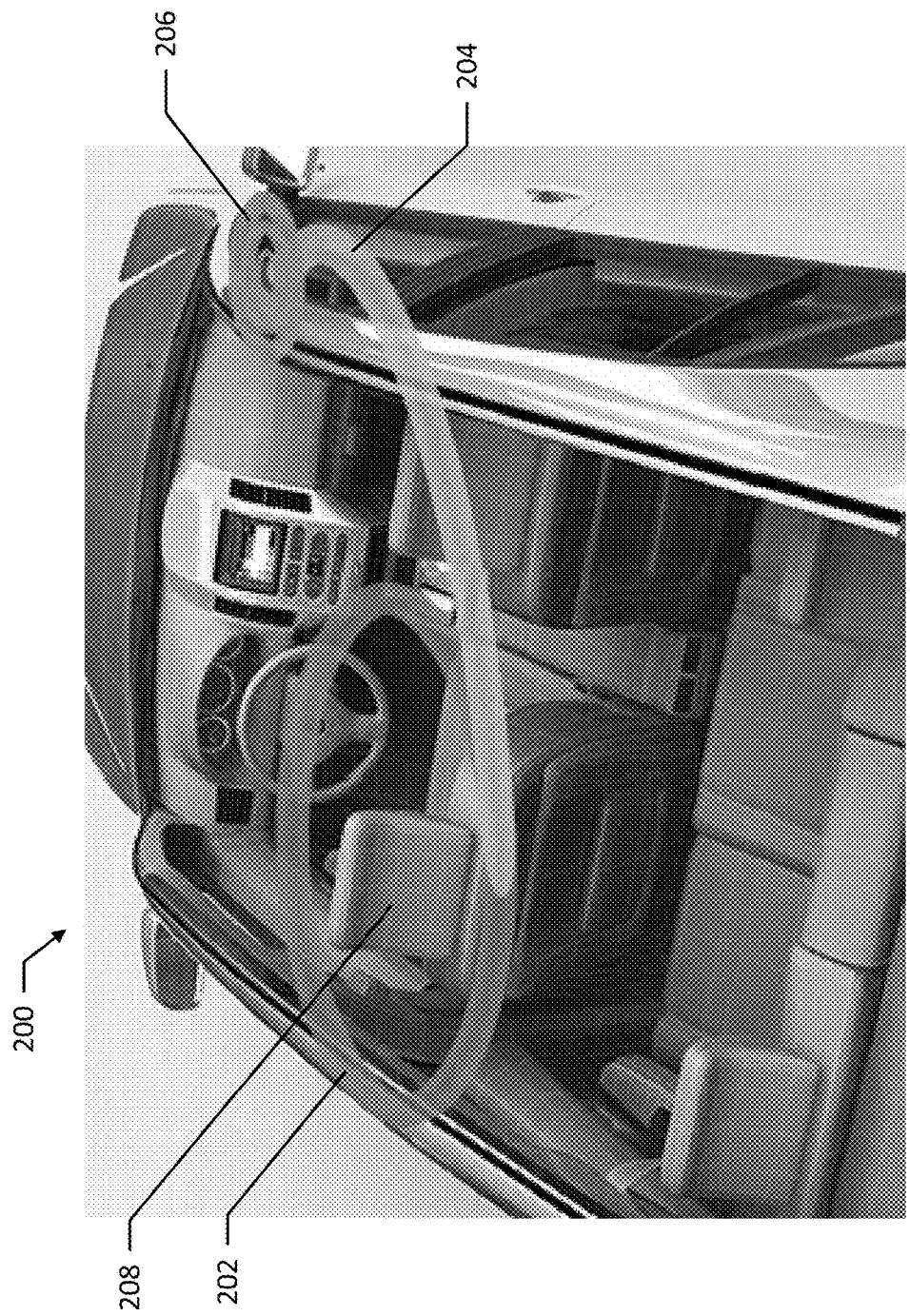
Figure 4:
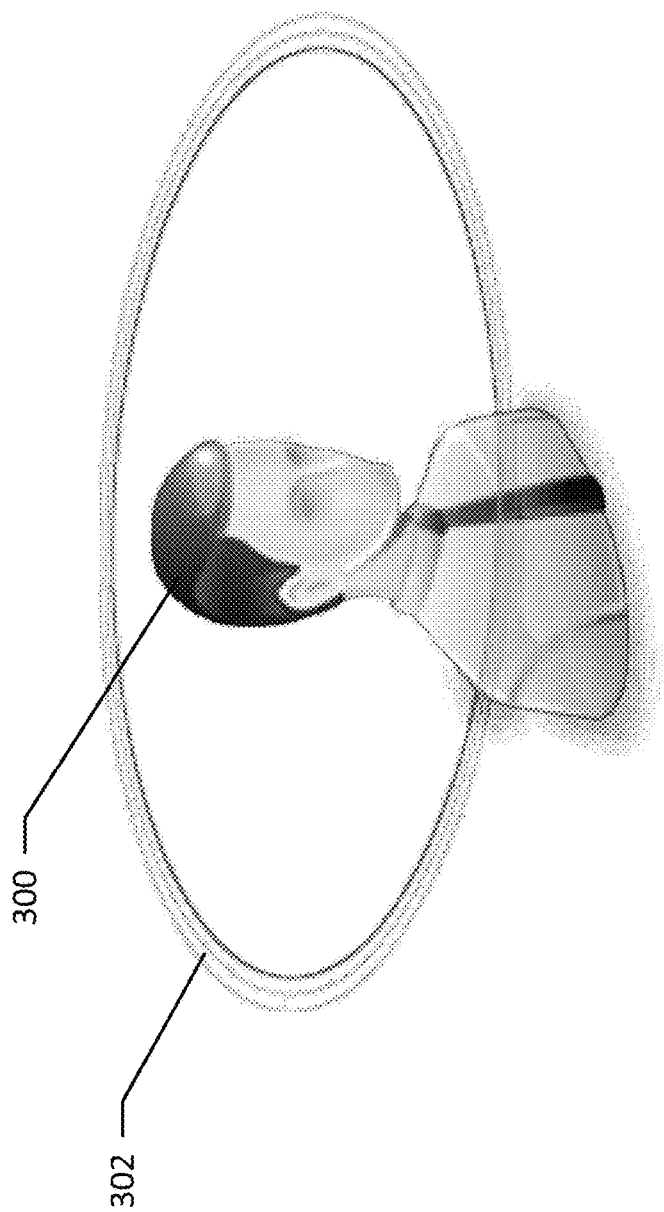
Figure 5:
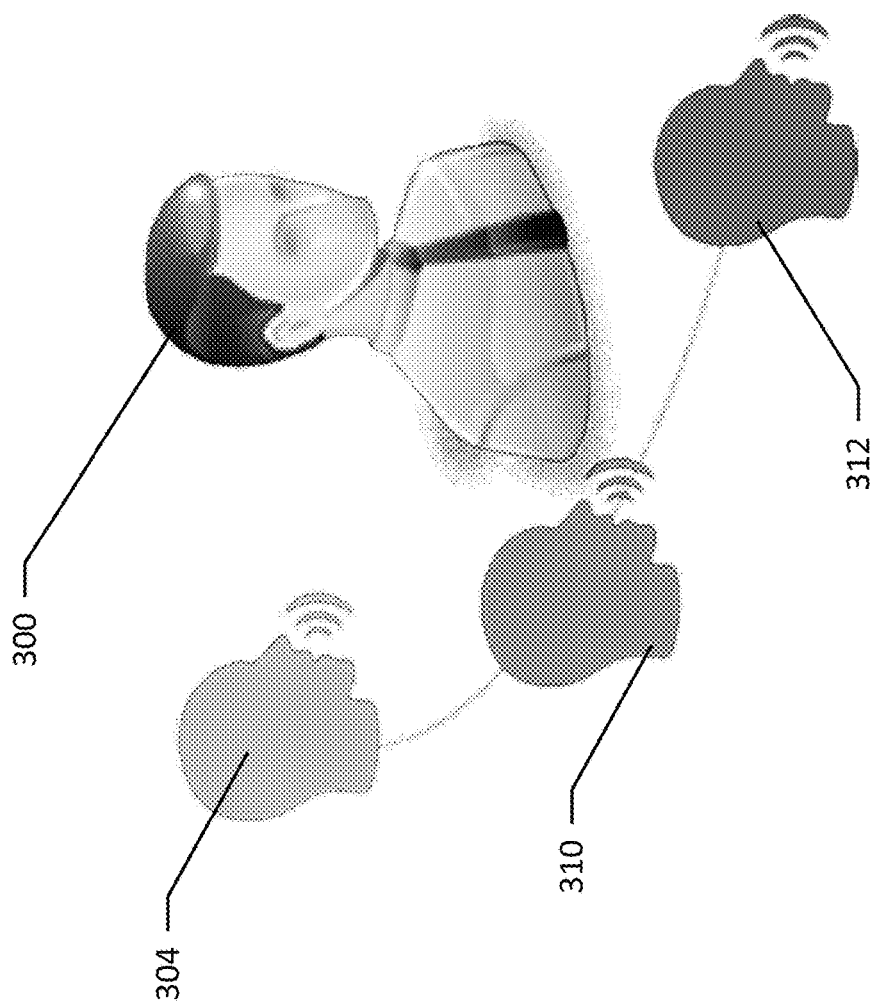
Figure 6:
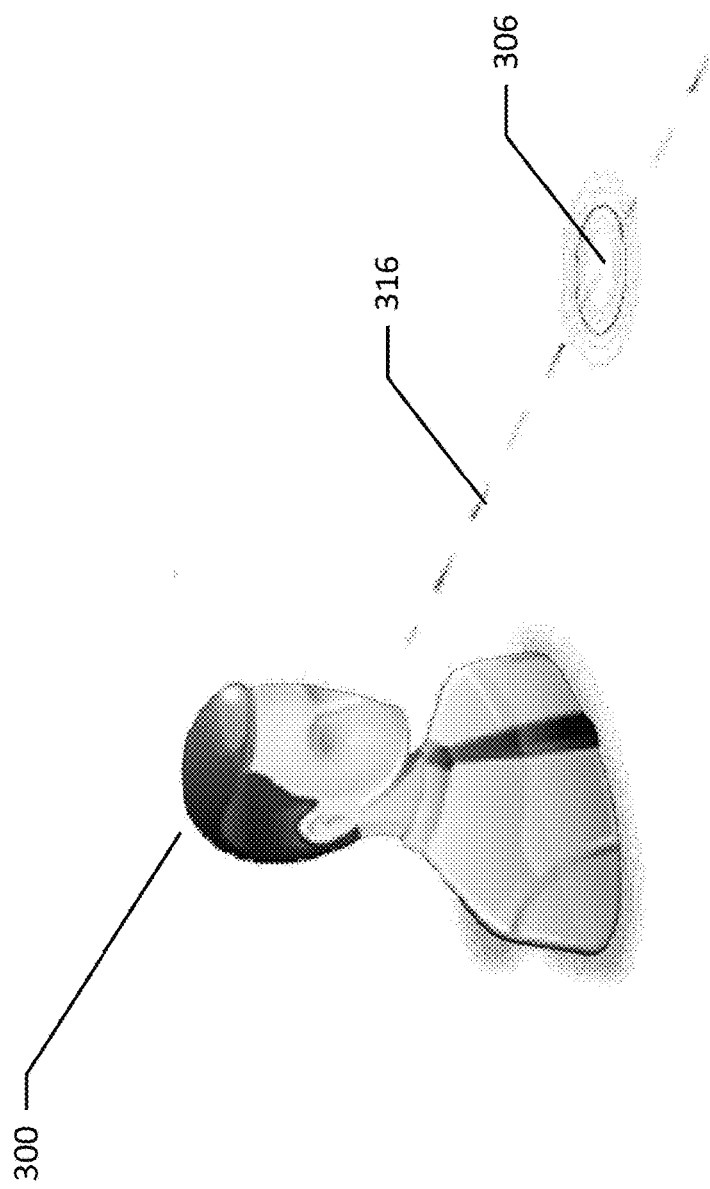
Figure 7:
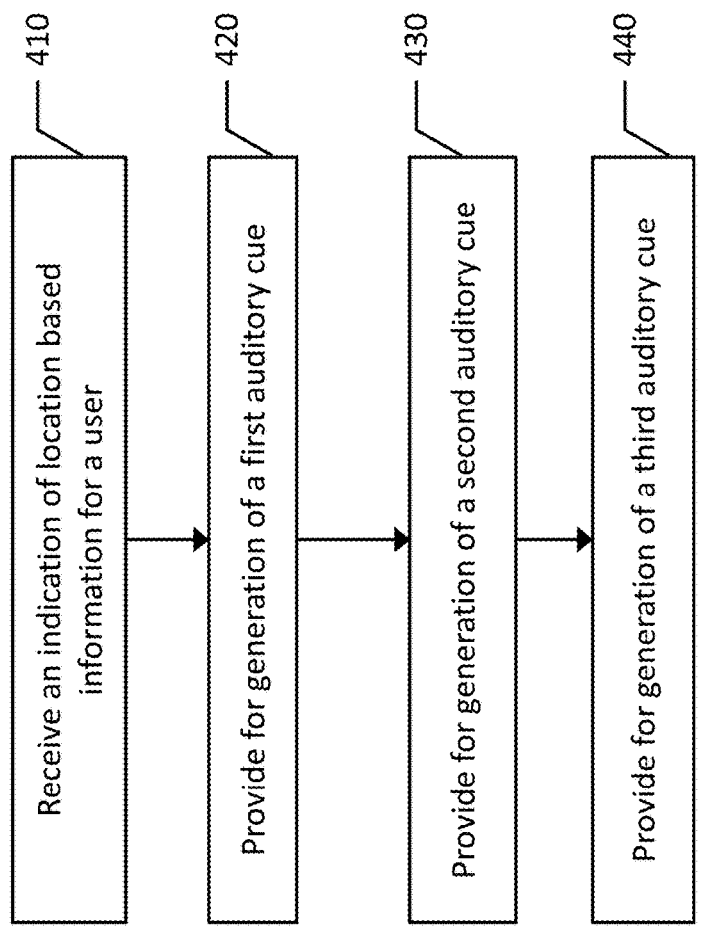

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system of implementing route guidance on a navigation system according to an example embodiment of the present disclosure;

FIG. 3 depicts an example environment and graphical representation of audible cues according to an example embodiment of the present disclosure;

FIG. 4 illustrates an example "catch" sound audible cue relative to a user according to an example embodiment of the present disclosure;

FIG. 5 illustrates an example "inform" sound audible cue relative to a user according to an example embodiment of the present disclosure;

FIG. 6 illustrates an example "aid" sound audible cue relative to a user according to an example embodiment of the present disclosure; and FIG. 7 is a flowchart of a method for providing audible cues to a user to facilitate route guidance or to provide information having a directional component according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment of the present invention for providing an effective delivery of information through spatial audio in a navigational context. A combined approach of auditory stimuli is described herein to form a spatial sound language. The spatial audio cues described herein may provide a useful and easily interpreted instruction to a user in a manner that promotes user understanding of the audio cues and precise location indications provided solely through auditory cues. The auditory cues of example embodiments may include multiple elements, such as a "catch" audio cue to initially grab a user's attention, an "inform" audio cue to inform the driver of the nature of the occurring event and direct the user's attention toward a relevant direction in space, and an "aid" audio cue to confirm and reinforce the spatial information of the "inform" cue aiding toward the action to be taken. As described herein, embodiments of the claims may provide for a user interface with a navigation system or vehicle infotainment system. The user interface described herein provides an intuitive and easily understood audio cues that convey information and relevant location to a user.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing a navigation system or infotainment system user interface. For example, the computing device may be a mobile terminal, such as a personal digital assistant (PDA), mobile telephone, smart phone, personal navigation device, smart watch, tablet computer, camera or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), accelerometer, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a mobile device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, a plurality of spatially arranged speakers, headphones, ear bud speakers, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may provide spatial auditory cues via speakers, headphones, earbuds, or the like, to a user to convey information and a relevant location, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

The apparatus 20 may support a mapping application so as to present maps or otherwise provide navigation assistance. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, lidar, ultrasonic and/or infrared sensors.

In example embodiments, a navigation system user interface may be provided to provide route guidance from an origin to a destination. Navigation systems may receive an indication of an origin, which may include a current location of a device on which the navigation system is operating (e.g., an in-vehicle navigation system or a mobile device, for example), and an indication of a destination where the user of the navigation system is going. In response to receiving the origin and destination pair, a route may be generated between the origin and destination. The route may be generated according to user preferences for fastest travel time, minimizing highways (e.g., limited access high-speed roadways), maximizing highways, shortest distance, etc. Further, waypoints may be provided between the origin and destination, or a route may include multiple, sequential destinations. Example embodiments provided herein may be used for a navigation system user interface to provide route guidance to the first destination, the last destination, or the ultimate destination with waypoints indicated in the route guidance from the origin and possibly points of interest along the route.

A map service provider database may be used to provide route guidance to a navigation system. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an in-vehicle navigation system, such as an ADAS (advanced driver assistance system), a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of one or more personalized routes or route segments based on one or more calculated and recorded routes, according to some example embodiments.

Route guidance from an origin to a destination may be communicated to a user through visual and/or auditory cues. Auditory cues are typically synthesized voice instructions that deliver spoken instructions to a driver regarding a next upcoming maneuver required to stay on a route to a destination. Navigation systems and routing engines may determine decision points within the road network corresponding to maneuvers, and these decision points may be provided to a text-to-speech engine for converting the maneuvers into spoken instructions. Spoken instructions may be the communication channel of choice, as opposed to written instructions on a display or visual instructions on a display, to improve safety, as the driver may be using their vision for the task of driving.

In the field of sound reproduction, improvements have been developed over years to enhance the auditory experience. Monoaural sound may be sufficient to convey a message; however, developments such as stereo sound and spatial audio methods (e.g., surround, binaural audio, Ambisonics, vector base amplitude panning (VBAP), virtual sound source positioning, etc.) have expanded the possibilities of using sound to simulate an entire three-dimensional environment and to convey rich auditory information such as the characteristic of emission of a sound source (e.g., is it a widespread source or a directional source), the sound source position, and distance from a listener. Further, the movement of a sound source in space may be conveyed using spatial audio methods. The characteristics of an acoustic space within which the sound is produced may be tuned to convey characteristics of a sound source with a high level of accuracy. These methods exploit the full capabilities of the human ear to perceive and discriminate more information about a sound event than simply its content.

As autonomous vehicle control begins to take shape, new interaction paradigms between users can be exploited. Vehicle autonomy can include partial autonomy with driver assistance features such as lane-keep assist, adaptive cruise control, and brake assist features, for example, but can also include full autonomy where a driver becomes a passenger in the vehicle while the vehicle controls all functions of driving. In some instances, vehicle autonomy may transition during different phases of a driving event, such as where a driver begins to drive along a route, but then "handover" vehicle control to an autonomous system. Handover events and experiences may require a complete engagement of the user, such as to receive cues as to when to take over or relinquish control of the vehicle which requires the full attention of the driver. A "spatially informed driver" may be informed of where the next action needs to take place in the handover experience. In full autonomous mode, where all vehicle users are passengers, interaction with the vehicle may be reduced to general instructions regarding destinations and the vehicle assumes an informative and/or entertaining role in the interaction. Further, in a higher degree of automation, vehicles may no longer resemble vehicles as conventionally used today, and may adapt into transport units that can include alienation from the surroundings outside the transport unit. Spatial awareness through sound augmentation of reality can offer a discrete solution to contrast alienation.

Conventional voice navigation instructions are delivered as a message only without any spatial considerations. This approach may be sufficient in straightforward navigational situations, such as a rural road intersection without any unconventional road features proximate the intersection, but as the complexity of roads and related maneuvers increases, such as around dense urban environments, additional information may be desirable. Visual displays of route guidance information and point of interest information may be more detailed and may provide a user a greater understanding of their surroundings; however, this may distract a driver from a maneuver if they are moving, particularly in a densely populated area. The delivered voice instructions alone may not be sufficient for a driver to interpret a maneuver in a spatial context.

Provided herein is a method to solve the problem related to context awareness and how to provide spatially relevant auditory information, in the form of spoken or other auditory stimuli that aids the driver of a vehicle in performing the next action whether it is a maneuver or a handover event. While a vehicle is in an autonomous mode, for achieving a truly immersive experience, information about a vehicle's surroundings may be conveyed not only as content, but as spatially localized information relevant to a specific point outside of the vehicle.

Embodiments described herein provide an effective delivery of information through spatial audio in the navigation context and in the informational context. A combined approach of auditory stimuli may form a "spatial sound language". Three consequential stages are proposed which may all be used together, or may be used in various sub-combinations in order to achieve the desired result. These three different information levels provide a differentiated approach regarding their sound content and spatial qualities in order to provide useful spatial information. The three information levels may include: Catch—to catch the driver's attention without being too invasive of distracting; Inform—to inform the driver on the nature of the occurring event and to direct the driver's attention to a direction in space; and Aid—to confirm and reinforce the spatial information aiding toward the action to be taken.

The "catch" sound may be characterized as a brief and omnidirectional sound, such as a ring of sound coming from all around a listener, used to announce that the system is initiating a communication to the diver. This enables a driver's spatial sound perception to awaken and to transition to a perceptually receptive state for the upcoming instruction if the driver is not already ready for such an instruction.

The "inform" sound may come in the form of spoken instructions such as a natural language sentence, delivering a more complex payload of information that cannot be unambiguously conveyed with a simple sound. The delivery of these spoken instructions may be done such that, spatially, the voice starts at the driver's head and continues to move toward the decision point (e.g., a maneuver/turn) or other location associated with the information that is being conveyed. The sound can be located in the horizontal plane of a three-dimensional space following a trajectory with high precision.

The "aid" sound may follow the "inform" sound and may be positioned on the horizontal plane of the three-dimensional space of the listener in the same position where the "inform" message ended its trajectory. The "aid" auditory cue may be to confirm, reinforce, and maintain the spatial memory of the direction given by the "inform" stimuli. The "aid" cue acts as a "sonic pin" attached toward the direction to be followed.

Different approaches are available for delivering spatial sound in a vehicle. Particularly the inform and aid cues that may be delivered using either a binaural approach with speakers adjacent to the driver's ears or Higher Order Ambisonics using an arrangement of multichannel speakers in a vehicle.

In order to provide useful navigation assistance or point of interest information through spatial auditory cues of example embodiments, a location of the user and vehicle must be determined. This may be performed through a combination of GNSS (Global Navigation Satellite System) sensors and other vehicle sensors, such as inertial measurement units (IMUs) or the like, as represented by sensors 21 of apparatus 20 in FIG. 1. Other positioning means may optionally be used, such as location referencing using road side objects, cellular signal or near-field communication signal fingerprinting or triangulation, etc. A coordinate pair, with varying degrees of accuracy dependent on the positioning methods may be used to determine the location of the vehicle. The determined location may be associated with a location on a digital map maintained, for example, by map data service provider 108 of FIG. 2.

A user of the vehicle, such a driver, may provide a desired destination using physical controls or voice activation. Optionally, a destination may be predicted using collected mobility patterns. Once a destination has been established, a route to the destination may be generated. Such a route may include decision points where a driver may be required to perform a maneuver. Optionally, the route may include points of interest or waypoint that may be established based on user preferences, mobility patterns, crowd-sourced information such as interest/popularity, or the like. The decision points, points of interest, and waypoints may each correspond to a specific coordinate pair in the map that is along or proximate the route to the destination.

Using a current location of a vehicle, the location of a decision point, and the required maneuver, a spatial audio cue may be generated. The spatial audio cue may conform to the Catch, Inform, Aid concept described above where three different audio cues need to be generated. FIG. 3 illustrates a visual depiction of the three spatial audio cues generated within the interior of a vehicle 200 according to the embodiments described herein. The catch sound 202, represented by the circle around the driver's seat headrest, provides an initial alert produced by the system. Generally the catch sound 202 may be omnidirectional in nature. The inform sound 204 represented by the arc provides a dynamic spatial transition, where a virtual source location or source point of the sound progresses from a position close to the driver's head or driver's seat headrest 208 and moves to a position aligned with the decision point, point of interest, or waypoint. The position aligned with the decision point, point of interest, or waypoint may be a location between the driver, and more specifically the driver's head, and the location to which the driver's attention is to be drawn. Using spatial audio techniques, the location of the sound generated during the inform sound 204 stage has a virtual source location that dynamically transitions from the driver to the location of interest. The inform sound 204 may provide a wandering voice producing natural language starting an instruction at the driver's head and guiding the attention toward the decision point, point of interest, or waypoint. The aid sound 206 has a virtual source position at the end of the inform sound 204 virtual source location and may be, for example, a short, distinct sound that can be identified as if it were occurring at a specific location within the soundscape. This aid sound 206 sets a marker corresponding to the decision point, point of interest, or waypoint.

The catch, inform, and aid sound principles of sonic language used to alert the driver provide a unique way of grabbing the attention of a user, steering that attention toward a location, and reinforcing the location. FIGS. 4-6 illustrate the auditory cues relative to a user, where a catch 302 sound may be heard in FIG. 4 as an omnidirectional sound with no apparent virtual source location as heard by a user/driver 300. FIG. 5 illustrates the inform sound 304 of a voice instruction as the virtual source of the voice instruction begins close to the user 300 and progresses through a trajectory including intermediate point 310 and final point 312. This dynamic movement of the virtual source helps the user 300 to better understand a location of the final point 312 as moving sounds may be easier to pinpoint for location relative to stationary sounds as described further below. FIG. 6 illustrates the aid sound 306 occurring at a virtual source location that is aligned between the user 300 and the location of interest (e.g., decision point, point of interest, waypoint, etc.). The user's 300 line of sight 316 may be directed toward the sound, which the steers the user's attention to the appropriate location.

The catch sound 202, 302 may be a static, omnidirectional sound with abstract, synthetic tones. The inform sound 204, 304 may be a sound with a moving virtual source location that includes, for example, speech providing information to a user 300. The aid sound 206, 306, may include a hybricon, for example, which may be an abstract sound that incorporates a sense of urgency. The hybricon may optionally have a repetitive content so that directional confirmation may be maintained as the user approaches the location.

The catch sound may create a perceptual transition from the soundscape surrounding the driver toward a state of mind ready to receive further information, such as the inform sound and the aid sound. The natural soundscape around a driver/user may be a mix of several sounds, such as road noise transmitted through wheels/tires to the passenger cabin of the vehicle, wind noise, directional sounds such as conversations with passengers, or distributed sounds such as a stereo or music player, etc.

To create a sense of global acoustic transition, the catch sound may be static in its position and omnidirectional in its spatial distribution with no definitive virtual source location. For example, it may be perceived as a ring of sound disposed at 360 degrees surrounding the user/driver. To create this effect, four plane waves may be located to the front, back, left, and right of a user's head and generated by high order ambisonics or other three-dimensional sound techniques and delivered through the audio speakers of the vehicle. Optionally, a similar effect can be created using several point sound sources positioned on a perimeter of a horizontal imaginary circle of a radius about one meter or greater centered proximate the user's head. Optionally, a similar effect can also be created using all the speakers in the car to output the same sound signal at the same moment and with the proper level.

To further augment the omnidirectional character of the sound, the sonic content may be an abstract earcon—a sound that is an abstract, synthetic tone—as opposed to an auditory icon. Earcons provide no intuitive link between the sound and what the sound represents. Earcons can therefore also be more difficult to localize in space, making them a good fit for the catch sound.

The inform sound is intended to lead the user/driver's attention toward one direction in space, such as where a driver needs to go or perform their next maneuver. To leverage a person's ability to locate sounds in space, a basic function of human perception, the inform sound may be a moving, dynamic sound. The sound may be rendered as a directional virtual source moving on a curved trajectory in the horizontal plane. In this manner, the acoustic sound generating device, whether headphones, headrest speakers, stereo speakers, multi-channel speakers (e.g., 5.1 or 7.1 surround sound speakers) may generate a sound having a virtual source location, where a user may perceive the source of the sound generated by the sound generating device to be coming from the virtual source location. The device may further cause the virtual source location to move in the curved trajectory of the horizontal plane. Sounds in motion may provide stronger localization cues than static sounds and strong mental representations of spatial directions. The sound trajectory may include a curved line on the azimuthal plane on which the sound travels at 30-50 degrees per second. Higher and lower speeds are possible and still well within the range of hearing perception of the location and movement. However, a speed range of around 30-50 degrees per second may be more pleasing to a user. Generally, the inform sound may not terminate at a location directly in front of or behind a user as this may cause back/front confusion. While a curved trajectory is described with respect to example embodiments provided herein, other trajectories are possible, such as linear trajectories or polyline trajectories, for example.

The frequency range of the human voice is within a range that the human ear is most sensitive to. Further, speech can carry unambiguous messages that abstract and pure sounds cannot. For the inform sound, a spoken instruction may be used to unambiguously inform the user/driver about the current reason of the prompt—whether it is an alert, a hazard, etc.—and the suggested action to be taken. The spoken content may be constructed following a two-stage principle: the first part of the phrase may provide context awareness information, while the second part of the phrase may offer a call to action, which may then be reinforced by the aid sound. For example, a message may include a condition or event that is occurring and to inform the user/driver of an action to take. The message may be that "an ambulance is approaching from behind: move to the right as soon as you can." The phrase may be enunciated while moving dynamically along the curved trajectory described above.

The aid sound may confirm and reinforce the received spatial information, aiding toward the action to be taken or direction to follow. The aid sound may come in a continuation to the spoken instructions of the inform sound and have a virtual source location proximate the end of the inform sound trajectory. The virtual source location of the aid sound might therefore be located on the horizontal plane of a three-dimensional space at the coordinates/angular direction where the inform message ended its movement. The aid sound functions as a "sonic pin" to reinforce memory of where to go. It is thus rendered as a static directional source that the user/driver can perceive toward the direction they are intended to take action toward. Map data and car sensor data may be used to further increase the precision of where to render a moved position of the aid sound, in coherence with what is the next possible maneuvering point and availability of movement or lane change.

The aid sound may reinforce the perception of the overall message by the user/driver as it provides an abstract directional cue that follows the spoken instructions. In this manner, redundancy may be achieved in the direction to take in the form of reconfirmation by the system in the event the user/driver could did not pay attention or get the content of the spoken message completely. For this reason, the content of the aid sound may be indicated to be a hybricon as hybricons are sounds that incorporate a sense of urgency. To maximize the aid sound, the hybricon may optionally be repetitive or have repetitive content so that direction confirmation may be provided to the user/driver without additional new sounds being presented.

According to some embodiments, the map data in map database 110 of map data service provider 108 may be used to define the timing of the three auditory cues which need to correspond to a location of a maneuver, point of interest, or waypoint taking into account an appropriate distance at which to start the notification, calculate a future vehicle position, and give the user/driver enough time to perform the maneuver.

According to further embodiments, adjustments may be made to the binaural or ambisonic sound and sound trajectories and angles using in-vehicle gaze tracking. As a user/driver moves their head while driving, providing an auditory cue to a specific location relative to the user becomes more difficult. Using a gaze tracker of a user may allow embodiments described herein to estimate where the ears of the user are by locating the eyes. The resulting ear offset may be fed into the system for accurate generation of the sound stage in relation to the position of the driver's head position and orientation. In the event of binaural audio delivered through headrest loud speakers, headphones, or earbuds, the eye tracking may optionally be used to select the most appropriate head related transfer function (HRTF) profile from an HRTF database by measuring the distance between the eyes of each user.

While embodiments described herein include a catch, inform, and aid auditory cue, embodiments may omit the catch or aid auditory cue and provide only the inform auditory cue, or the auditory cue paired with the catch auditory cue or the aid auditory cue. Further, while embodiments may be implemented in a vehicle as a navigational aid or route guidance mechanism, embodiments may optionally be implemented for a pedestrian or operator of other mode of transportation, such as a bicycle. In such a manner, a pedestrian or cyclist may use headphones or earbuds, and may use example embodiments described herein in the same manner as an automotive implementation.

The device or apparatus generating the sound of the catch, inform, and aid auditory cues may be configured to perform actions to have each sound generating device (e.g., speaker, headphone, earbud) to reproduce a specific sound signal such that the combination of audio signals from the various sound generating devices will result in a perceived virtual source location of the sound. The actions may include a combination of time delays, spectrum filters, amplitude modulation, etc. may vary depending upon the specific spatial rendering technique used. The rendering technique may vary in dependence of the hardware available to reproduce the sound. For example, if the sound producing hardware includes earbuds or headphones, a head-related transfer function (HRTF) binaural rendering may be used. Ambisonics, Surround, vector-based amplitude panning (VBAP) or similar techniques may be used if the sound producing hardware includes a set of speakers.

According to some embodiments described herein, in a scenario including semi-autonomous driving where a handoff occurs between a driver and the vehicle for control over the vehicle, embodiments described herein may facilitate the handover. The dichotomy between omnidirectional sound and directional sound may be used to suggest moments in which a handover is to happen. The catch, inform, and aid sequence may be used to announce the end of an autonomous driving road, informing the driver about the need to take over control of the vehicle. In such a scenario, the catch and inform auditory cues may be used with or without the aid auditory cue.

In an autonomous driving scenario, the catch, inform, aid auditory cues may be used to provide natural interaction between a driver and the car. The omnidirectional catch sound can, for example, confirm to the driver that the system has received voice instructions (e.g., "what is that building?") and that the system is now processing the information. By using geographical data about the context surrounding the car (e.g., landmarks streets, POIs, etc.) and eventually data from the driver's eye tracking, the system of example embodiments may then use the inform sound to convey desired information to the driver matching the voice trajectory of the inform sound within the geographical coordinates of the requested information (e.g. "that is the Transamerica building"). The aid sound may be used to deliver calls to a driver, such as "do you want to go there."

FIG. 7 is a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 7 illustrates a method for providing a user interface for route guidance in a navigation system. As shown at 410, an indication of location based information may be received. This indication may be in the form of an upcoming maneuver to remain on a route of a route guidance function of a navigation system, or a point of interest that is being approached. The information provided to the user includes a location that relates to the information provided. At 420, a first auditory cue may be provided. This may be provided by sound generating hardware such as a set of speakers, a pair of headphone or earbuds, or any hardware configured to produce audible sounds. The first auditory cue may be generated to be perceived by a user as an omnidirectional sound, lacking a specific virtual source location. At 430, a second auditory cue may be generated. The second auditory cue may be produced using three-dimensional spatial audio techniques to have a virtual source relative to the user, and the second auditory cue may dynamically move during generation of the auditory cue from the first virtual source location relative to the user to a second virtual source location relative to the user. This second virtual source location may be positioned between the user and the location associated with the location based information. In this manner, the user's attention is drawn to the virtual source location—beyond which is visible the location related to the information. A third auditory cue may be generated at 440, where the third auditory cue is also produced using three-dimensional spatial audio techniques to have a virtual source proximate the location where the second auditory cue ended, reminding the user of the location indicated by the second auditory cue.

In an example embodiment, an apparatus for performing the method of FIG. 7 above may comprise a processor (e.g., the processor 24) configured to perform some or each of the operations (410-440) described above. The processor may, for example, be configured to perform the operations (410-440) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 410-440 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed by the at least one processor, cause the apparatus to at least:
receive an indication of location based information for a user;
provide for generation of a first auditory cue in response to receiving the indication of location based information, wherein the first auditory cue comprises a sound configured to alert the user of the availability of the location based information; and
provide for generation of a second auditory cue having a moving virtual source location using three-dimensional spatial audio effects, the apparatus further caused to:
provide for generation of a beginning of the second auditory cue at a first virtual source location; and
provide for generation of a transition phase of the second auditory cue moving the moving virtual source location from the first virtual source location along a trajectory and ending at a second virtual source location, wherein the second virtual source location is a location positioned between the user and a location identified in the location based information.

2. The apparatus of claim 1, wherein the apparatus is further caused to:
provide a third auditory cue in response to the second auditory cue ending, wherein the third auditory cue comprises a sound generated at the second virtual source location.

3. The apparatus of claim 1, wherein the first auditory cue comprises an omnidirectional sound lacking a perceptible virtual source location from which the sound emanates.

4. The apparatus of claim 1, wherein the second auditory cue comprises a natural language sentence conveying the location based information to the user.

5. The apparatus of claim 1, wherein the first auditory cue and second auditory cue are configured to be generated by a plurality of audio speakers using at least one spatial audio method.

6. The apparatus of claim 1, wherein the first virtual source location is proximate the user's head and wherein the trajectory is a curved trajectory from the first virtual source location to the second virtual source location.

7. The apparatus of claim 6, wherein the curved trajectory is in a horizontal plane.

8. A computer program product comprising at least one non-transitory computer-readable storage medium having computer-executable program code instructions stored therein, the computer-executable program code instructions comprising program code instructions that, when executed by a processor, cause the processor to:
receive an indication of location based navigation information for a user; and
provide for generation of an auditory cue having a moving virtual source location using three-dimensional audio effects, the apparatus further caused to:
provide for generation of a beginning of the auditory cue at a first virtual source location; and
provide for generation of a transition phase of the auditory cue moving the moving virtual source location from the first virtual source location along a trajectory and ending at a second virtual source location, wherein the second virtual source location is a location positioned between the user and a location identified in the location based navigation information, and wherein the auditory cue comprises natural language instructions regarding route guidance.

9. The computer program product of claim 8, wherein the auditory cue is a first auditory cue, the computer program product further comprising program code instructions to:
provide a second auditory cue in response to the first auditory cue ending, wherein the second auditory cue comprises a sound generated with a virtual source location at the second virtual source location.

10. The computer program product of claim 8, wherein the auditory cue comprises an instruction regarding a maneuver to remain on a route of the route guidance, and wherein the second virtual source location is positioned between the user and a location associated with the maneuver.

11. The computer program product of claim 8, wherein the auditory cue comprises a first auditory cue, the computer program product further comprising program code instructions to provide for generation of an initial auditory cue, wherein the initial auditory cue precedes the first auditory cue and comprises an omnidirectional sound relative to the user.

12. The computer program product of claim 11, wherein the initial auditory cue and first auditory cue are configured to be generated by a plurality of audio speakers using at least one spatial audio method.

13. The computer program product of claim 8, wherein the first virtual source location is proximate the user's head and wherein the trajectory is a curved trajectory from the first virtual source location to the second virtual source location.

14. The computer program product of claim 13, wherein the curved trajectory is in a horizontal plane.

15. A method comprising:
   receiving an indication of location based information for a user;
   providing for generation of a first auditory cue having a moving virtual source location using three-dimensional audio effects, wherein providing for generation of the first auditory cue comprises:
   providing for generation of a beginning of the first auditory cue at a first virtual source location; and
   providing for generation of a transition phase of the first auditory cue moving the moving virtual source location from the first virtual source location along a trajectory and ending at a second virtual source location, wherein the second virtual source location is a location positioned between the user and a location identified in the location based information; and
   providing a second auditory cue in response to the first auditory cue ending, wherein the second auditory cue comprises a sound generated at the second virtual source location.

16. The method of claim 15, further comprising:
   providing an initial auditory cue before the first auditory cue, wherein the initial auditory cue comprises an omnidirectional sound relative to the user.

17. The method of claim 16, wherein the initial auditory cue comprises an omnidirectional sound lacking a perceptible virtual source location from which the sound emanates.

18. The method of claim 15, wherein the first auditory cue comprises a natural language sentence conveying the location based information to the user.

19. The method of claim 15, wherein the first auditory cue and second auditory cue are configured to be generated by a plurality of audio speakers using at least one spatial audio method.

20. The method of claim 15, wherein the first virtual source location is proximate the user's head and wherein the trajectory is a curved trajectory from the first virtual source location to the second virtual source location.

* * * * *